(12) United States Patent
Agarwal et al.

(10) Patent No.: US 11,216,241 B2
(45) Date of Patent: Jan. 4, 2022

(54) METHOD AND DEVICE FOR AUDIO MANAGEMENT

(71) Applicant: Samsung Electronics Co., Ltd., Suwon-si (KR)

(72) Inventors: Neha Agarwal, Noida (IN); Sumeet Kumar Agrawal, Noida (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/833,505

(22) Filed: Dec. 6, 2017

(65) Prior Publication Data

US 2018/0165059 A1 Jun. 14, 2018

(30) Foreign Application Priority Data

Dec. 13, 2016 (IN) .............................. 201611042521

(51) Int. Cl.
| | |
|---|---|
| G06F 3/00 | (2006.01) |
| G06F 3/16 | (2006.01) |
| G06F 3/0482 | (2013.01) |
| G06F 16/00 | (2019.01) |
| G06F 3/0483 | (2013.01) |
| G06F 40/205 | (2020.01) |
| G06F 3/0484 | (2013.01) |

(52) U.S. Cl.
CPC ............ *G06F 3/165* (2013.01); *G06F 3/0482* (2013.01); *G06F 3/0483* (2013.01); *G06F 3/0484* (2013.01); *G06F 16/00* (2019.01); *G06F 40/205* (2020.01)

(58) Field of Classification Search
CPC ...... G06F 3/165; G06F 3/0484; G06F 40/205; G06F 16/00; G06F 3/0483; G06F 3/0482

USPC .......................................................... 715/716
See application file for complete search history.

(56) References Cited

U.S. PATENT DOCUMENTS

| | | | | |
|---|---|---|---|---|
| 7,269,330 B1 * | 9/2007 | Iggulden | .............. | H04H 60/375 |
| | | | | 348/460 |
| 8,200,962 B1 * | 6/2012 | Boodman | ............... | G06F 21/53 |
| | | | | 713/161 |
| 8,250,228 B1 * | 8/2012 | Johansson | ................. | G06F 9/46 |
| | | | | 709/231 |
| 8,296,783 B1 * | 10/2012 | Piira | ....................... | G06F 1/329 |
| | | | | 719/328 |
| 8,775,965 B1 * | 7/2014 | Kuscher | ................ | G06F 3/0481 |

(Continued)

OTHER PUBLICATIONS

Cozma, Nicole, "Automatically mute background tabs in Chrome," Best Tablets of 2017, www.cnet.com, Sep. 30, 2014, [http://www.cnet.com/how-to/automatically-mute-background-tabs-in-chrome/], 9 pages.

(Continued)

*Primary Examiner* — Cesar B Paula
*Assistant Examiner* — David Faber

(57) ABSTRACT

The present disclosure relates to method and device for audio management in multiple tabs of one or more web browsers. In accordance with one embodiment the method comprises the step of detecting switching from a first tab to a second tab. Upon detecting the switching, the method comprises determining a category of the second tab after. Based on the determined category, the method comprises controlling an audio of the first tab and/or the second tab and/or a further tab.

17 Claims, 17 Drawing Sheets

| Switching From | | Action taken on tabs |
|---|---|---|
| Tab1 | Tab2 | |
| Audio Producing tab | Audio Producing tab | 1. Muting the first tab and playing second tab<br>2. Muting the first tab and playing the second tab after audio adjustment (based on URL, audio metadata, stored user interest, URL content)<br>3. First tab will continue playing audio, if second tab audio is from advertisement or of non user interest. |
| Non-Audio Producing tab | Audio Producing tab | 1. Muting a further tab and playing the second tab<br>2. Playing the second tab (if there is no audio playing further tab)<br>3. Keeping further tab sound enabled (if audio is advert. Or of non user interest)<br>4. Muting the second tab if audio is advert. or of non user interest |
| Audio Producing tab | Non-Audio Producing tab | 1. Muting the first or further tab (in case second tab require user attention)<br>2. Decreasing volume of the first tab or further tab (based on URL, audio metadata, user interest, URL content of second tab)<br>3. Continuing playing the audio on first tab or further tab (In case second tab do not require attention) |
| Non-Audio Producing tab | Non-Audio Producing tab | 1. Keeping further tab mute (first tab required attention and second tab also require attention)<br>2. Keeping Further tab playing Audio without level adjustment<br>3. Keeping further tab playing and making audio level adjustment (based on URL of second tab, user interest or audio metadata, URL content etc.) |

(56) References Cited

U.S. PATENT DOCUMENTS

| | | | |
|---|---|---|---|
| 8,959,438 B2* | 2/2015 | Wiltzius | G06F 3/0482 715/727 |
| 9,071,867 B1* | 6/2015 | Ray | H04N 21/4223 |
| 9,535,653 B2* | 1/2017 | Filev | G06F 3/165 |
| 9,772,980 B1* | 9/2017 | Qin | H04N 7/0122 |
| 9,886,160 B2* | 2/2018 | Xian | G06F 3/0481 |
| 9,954,919 B1* | 4/2018 | Khan | G06F 16/9574 |
| 10,387,104 B2* | 8/2019 | Decker | G06F 16/957 |
| 10,409,469 B2* | 9/2019 | Cheng | G06F 16/986 |
| 2006/0020538 A1* | 1/2006 | Ram | G06F 3/0482 705/37 |
| 2009/0049373 A1* | 2/2009 | Sharma | G06F 16/958 715/234 |
| 2009/0106657 A1* | 4/2009 | Chaudhri | G06F 3/04847 715/716 |
| 2011/0088039 A1* | 4/2011 | Tabone | G06F 21/6218 718/104 |
| 2011/0113337 A1* | 5/2011 | Liu | G06F 3/167 715/727 |
| 2012/0022926 A1* | 1/2012 | Ramanathan | G06Q 30/0241 705/14.4 |
| 2012/0023404 A1* | 1/2012 | Liu | G06F 3/0483 715/716 |
| 2013/0080930 A1* | 3/2013 | Johansson | G06F 9/46 715/760 |
| 2013/0238996 A1 | 9/2013 | Ding et al. | |
| 2014/0068434 A1* | 3/2014 | Filev | G06F 3/0484 715/716 |
| 2014/0068440 A1* | 3/2014 | Wiltzius | G06F 3/0481 715/727 |
| 2014/0281983 A1* | 9/2014 | Xian | G06F 3/0481 715/716 |
| 2015/0121226 A1* | 4/2015 | Steiner | H04L 65/80 715/722 |
| 2015/0193061 A1* | 7/2015 | Stekkelpak | G06F 3/165 715/716 |
| 2015/0324166 A1* | 11/2015 | Lin | G06F 3/165 709/203 |
| 2016/0357507 A1* | 12/2016 | Decker | G06F 16/957 |
| 2018/0082340 A1* | 3/2018 | Freund | G06Q 30/0277 |
| 2018/0285148 A1* | 10/2018 | Dutton | G06F 9/4843 |
| 2019/0180330 A1* | 6/2019 | Fein | G06Q 30/0275 |
| 2020/0081753 A1* | 3/2020 | Deluca | G06F 3/167 |

OTHER PUBLICATIONS

Gordon, Whitson, "Enable Chrome's "Mute This Tab" Shortcut in the Dev Channel," www.lifehacker.com, Sep. 30, 2014, [https://lifehacker.com/enable-chromes-mute-this-tab-shortcut-in-the-dev-chan-1640772471], 2 pages.

Marshall, Carla, "By 2019, 80% of the World's Internet Traffic Will be Video [Cisco Study]," www.tubularinsights.com, Jun. 11, 2015, [http://tubularinsights.com/2019-internet-video-traffic/], 9 pages.

Statista, "Percentage of internet users who watch online video content on any device as of Jan. 2017, by country," www.statista.com, Sep. 28, 2017, [https://www.statista.com/statistics/272835/share-of-internet-users-who-watch-online-videos/], 4 pages.

Examination Report dated Feb. 5, 2020, in connection with Indian Patent Application No. 201611042521, 6 pages.

\* cited by examiner

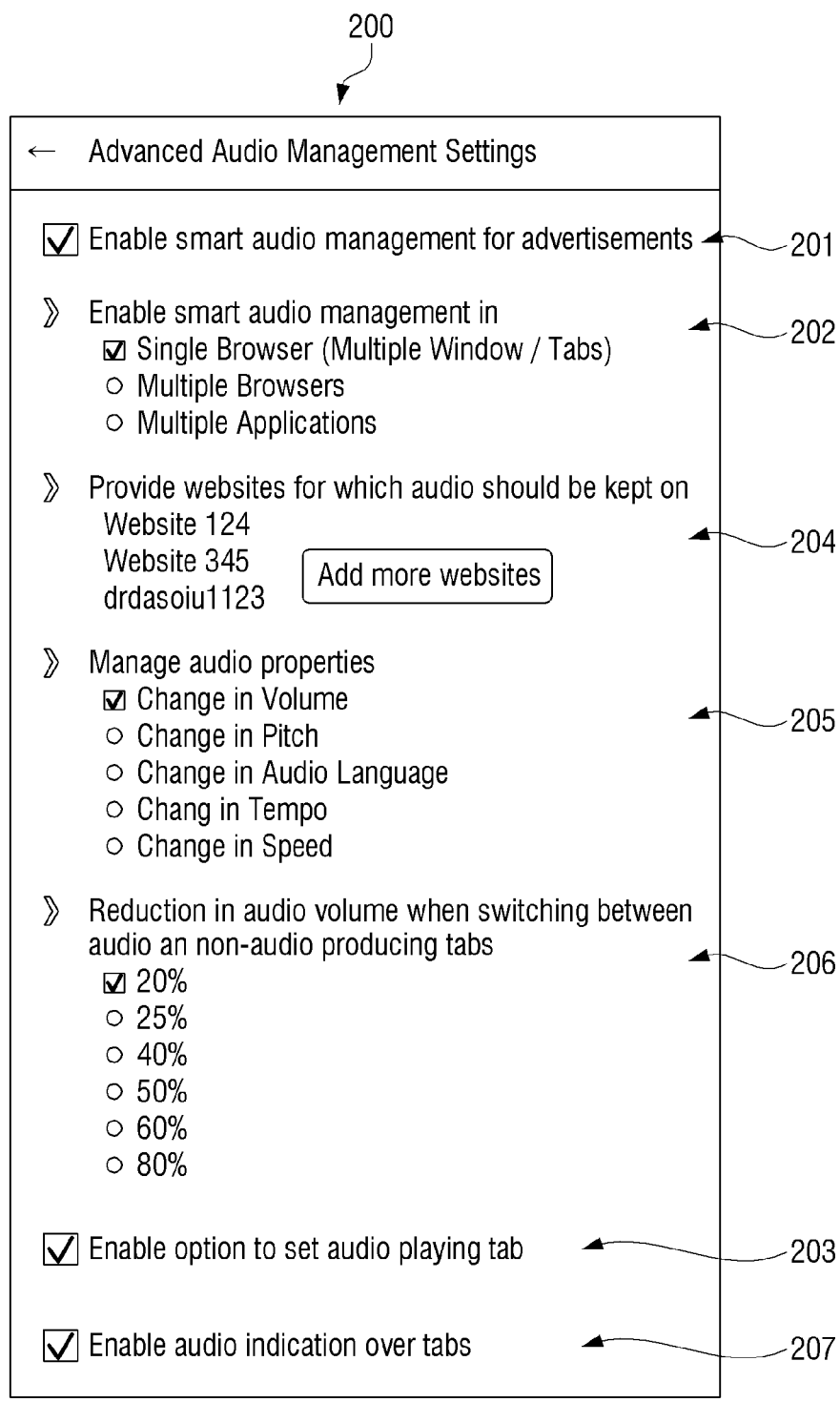

| Switching From | | Action taken on tabs |
|---|---|---|
| Tab1 | Tab2 | |
| Audio Producing tab | Audio Producing tab | 1. Muting the first tab and playing second tab<br>2. Muting the first tab and playing the second tab after audio adjustment (based on URL, audio metadata, stored user interest, URL content)<br>3. First tab will continue playing audio, if second tab audio is from advertisement or of non user interest. |
| Non-Audio Producing tab | Audio Producing tab | 1. Muting a further tab and playing the second tab<br>2. Playing the second tab (if there is no audio playing further tab)<br>3. Keeping further tab sound enabled (if audio is advert. Or of non user interest)<br>4. Muting the second tab if audio is advert. or of non user interest |
| Audio Producing tab | Non-Audio Producing tab | 1. Muting the first or further tab (in case second tab require user attention)<br>2. Decreasing volume of the first tab or further tab (based on URL, audio metadata, user interest, URL content of second tab)<br>3. Continuing playing the audio on first tab or further tab (in case second tab do not require attention) |
| Non-Audio Producing tab | Non-Audio Producing tab | 1. Keeping further tab mute (first tab required attention and second tab also require attention)<br>2. Keeping Further tab playing Audio without level adjustment<br>3. Keeping further tab playing and making audio level adjustment (based on URL of second tab, user interest or audio metadata, URL content etc.) |

METHOD AND DEVICE FOR AUDIO MANAGEMENT

CROSS-REFERENCE TO RELATED APPLICATIONS

This application is related to and claims priority to Indian Application No. 201611042521 filed on Dec. 13, 2016, the contents of which are incorporated herein by reference.

TECHNICAL FIELD

The present disclosure generally relates to tabbed or multi-window browsers and more particularly to audio management in the tabbed or multi-window browsers.

BACKGROUND

Tabbed or multi-window browsers enable users to open multiple tabs on computing devices and stream/play multimedia content on each or different tabs. Such multimedia content includes, but is not limited to, audio, video, audio-video, text with audio, text without audio, animation with audio, and animation without audio. Typically, the browser continually streams/plays the multimedia content having audio in one tab even when the user has switched or opened another tab. However, in one scenario, the user can open multiple tabs that can stream/play (hereinafter interchangeably referred to as produce) multimedia content having audio. In such scenario, the browser continuously and simultaneously produces audio from all the tabs thereby creating an irritating experience. The browser may provide audio icon to highlight tabs playing audio and to control audio by way of muting the audio. To avoid such irritation, the user has to perform various manual activities such as pausing streaming/playing of the multimedia content using the audio icon or other controls and muting/reducing volume of the device itself. Further, the browser does not have ability to decide which tab is producing audio when a current or active tab is not producing audio. This leads to confusion as the user will have to manually search for relevant or desired tab producing the audio. In addition, the browser is unable to decide automatically volume level of audio in any tab based on user interest and/or content of active tab, and is unable to control audio from advertisements.

Various solutions are available to overcome the above deficiency. By way of an example, US20140068434 discloses methods and system for adjusting audio volume of multimedia when switching between multiple multimedia content. Accordingly, a multiple media module receives data indicating a status of a tab of a graphical user interface (GUI) presented on a user device. The tab is provided on a web browser and comprises a streaming media player. The multiple media module determines, based on the data indicating the status of the tab, whether the tab is active or not. The tab is not active if the tab is in the background of the GUI, behind one or more other tabs. If the tab is not active, the multiple media module mutes an audio component of a streaming media file playing in the streaming media player. If the tab is active, the multiple media module determines if a volume level of the audio component is currently muted. However, a video component of the streaming media file may still be continued. If the volume level of the audio component is currently muted, the volume level is increased to a default setting. If the volume level of the audio component is not currently muted, a current setting of the volume level of the audio component is maintained. The process is performed for all other tabs of the GUI. However, this solution only adjusts audio of currently active tab and mutes audio of remaining tabs. This leads to poor user experience if the user has selected a particular tab as relevant tab and the audio of the particular tab will be muted whenever the tab is not active. Further, the user has to perform various manual activities if the user desires to listen to the audio of the particular tab such as closing other tabs, tracking the particular tab, and playing the audio again in the particular tab.

By way of another example, U.S. Pat. No. 8,250,228 discloses methods and apparatus for pausing or terminating video portion while continuing to run audio portion of plug-in on browser. Accordingly, a browser on a user's computer may launch plug-in within tabs. The plug-in may enable the browser to perform additional functionalities, such as playing video or animations and/or audio content, which a web server sent to the user's computer in response to a request. Examples of the plug-in include Adobe Flash Player, QuickTime, and Java. The browser terminates or modifies the running of the plug-in based on the tab associated with the plug-in being hidden, and/or based on other criteria, such as a battery or power level of the computing device upon which the browser is running. Examples of such modification include stopping a portion or feature, such as video content or animations of the plug-in, from running and reducing quality or bandwidth of video content or animations while allowing another portion or feature such as audio content of the plug-in to run. However, this solution allows playing audio of remaining tabs along with active tab if the criteria is not met. This leads to poor user experience if all the tabs have plug-in that can play audio content. Further, the user has to perform various manual activities if the user desires to listen to the audio of the particular tab. Examples of the activities include closing other tabs, and tracking the particular tab and playing the audio again.

By way of one another example, U.S. Pat. No. 8,959,438 discloses methods and system for generating media control pane in browser. The media control pane is a simplified user interface for accessing multiple sources of media files through the browser. Accordingly, navigation to a selected website through a browser is detected and the selected website is scanned to identify media content. For the identified media content in the selected website, a media tab is created for association with the browser. The media tab includes a unified set of media controls, which are mapped to native controls of the selected website having the media content. The media tab is then associated with the browser that enables input at the media tab to be communicated to selected ones of the native controls, without accessing the native controls at the selected website. However, this solution requires the user to perform manual activities for managing audio being played by multiple tabs.

As can be gathered from above, the browser, in accordance with present solutions, in incapable of audio management when simultaneous audio is emanating from multiple sources such as multiple tabs on same browser, multiple tabs on multiple browsers, and multiple applications. The browser does not have any feature to automatically detect and handle audio such as adjusting audio level based on active tab and muting audio during tab switching and/or auto-play. This leads to poor user experience when user wants to hear only single audio content at a time. In addition, the browser is incapable of automatically muting advertisement or prioritizing audio from one tab over audio of other tab. Moreover, user interests and content of tabs are not considered during audio management. Thus, a complete solution is not available to control or manage audio being played in multiple tabs or windows. As such, user involvement becomes necessary leading to frustration among users that in turn leads to a poor experience.

Thus, there exists a need for a solution to overcome above-mentioned deficiencies.

SUMMARY

To address the above-discussed deficiencies, it is a primary object to provide for audio management in multiple tabs of one or more web browsers. In accordance with one embodiment, switching from a first tab to a second tab is detected. After detection of the switching of tab, a category of the second tab is determined. The category of the second tab can be an audio producing tab or a non-audio producing tab. An audio of the first tab and/or the second tab and/or a further tab is controlled based on the determined category. The controlling of the audio includes muting the audio, unmuting the audio, and changing at least one parameter of the audio such as volume, pitch, audio language, tempo, and speed. In addition, the at least one parameter of the audio can be changed with transition effect.

The advantages of this disclosure include, but not limited to, playing and/or controlling audio from only one tab from amongst multiple tabs capable of streaming audio. In other words, at any point of time audio from only one source will be played/streamed. Thus, this disclosure provides capability to browser to automatically decide one audio playing tab. Further, such controlling of audio is based on detection of switching between two tabs, i.e., current tab and other tab from amongst multiple tabs, and content of the multiple tabs. As such, audio of even inactive or background tab can be played even if current tab does not play/stream any audio. This improves user experience considerably as the audio is controlled based on user's needs/desires without the user performing any manual activities. In addition, a complete solution to manage audio being played in multiple tabs or windows is provided as a decision of which tab will play audio is made automatically without necessitating any manual activities. This enables the user to have a pleasant video-viewing or music-listening experience.

These aspects and advantages will be more clearly understood from the following detailed description taken in conjunction with the accompanying drawings and claims.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2 illustrates an example user-interface for audio management in multiple tabs, in accordance with the embodiment of the present disclosure;

FIG. 6 illustrates an example table summarizing audio management in multiple tabs of one or more web browsers.

Figure 1A:
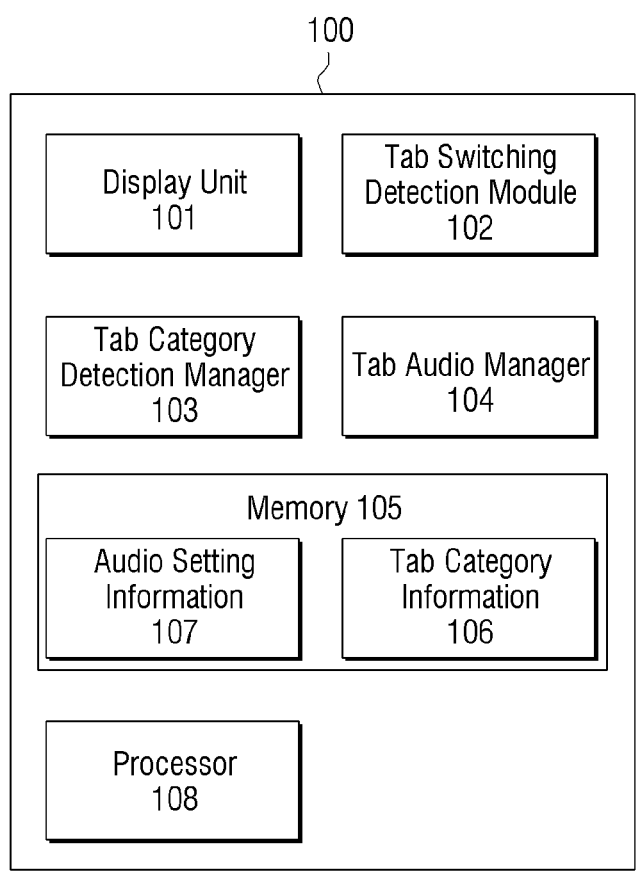
FIGS. 1A and 1B illustrate a device for audio management in multiple tabs of one or more web browsers, in accordance with an embodiment of the present disclosure.

It may be noted that to the extent possible, like reference numerals have been used to represent like elements in the drawings. Further, those of ordinary skill in the art will appreciate that elements in the drawings are illustrated for simplicity and may not have been necessarily drawn to scale. For example, the dimensions of some of the elements in the drawings may be exaggerated relative to other elements to help to improve understanding of aspects of the disclosure. Furthermore, the one or more elements may have been represented in the drawings by conventional symbols, and the drawings may show only those specific details that are pertinent to understanding the embodiments of the disclosure so as not to obscure the drawings with details that will be readily apparent to those of ordinary skill in the art having benefit of the description herein.

DETAILED DESCRIPTION

FIGS. 1A through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching and illuminating some embodiments and their specific features and elements and does not limit, restrict or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

In the present disclosure, relational terms such as first and second, and the like, may be used to distinguish one entity from another entity, without necessarily implying any actual relationship or order between such entities. In embodiments of the present disclosure, relational terms such as first and second, and the like, may be used to distinguish one entity from another entity, without necessarily implying any actual relationship or order between such entities.

It is to be understood that the singular forms "a," "an," and "the" include plural referents unless the context clearly dictates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

In an example embodiment, 'a module' or 'a unit' performs at least one function or operation, and may be realized as hardware, software, or combination thereof. In addition, a plurality of 'modules' or a plurality of 'units' may be integrated into at least one module and may be realized as at least one processor except for 'modules' or 'units' that should be realized in a specific hardware.

Unless otherwise defined, all terms, and especially any technical and/or scientific terms, used herein may be taken to have the same meaning as commonly understood by one having an ordinary skill in the art.

Reference is made herein to some "embodiments." It should be understood that an embodiment is an example of a possible implementation of any features and/or elements presented in the attached claims. Some embodiments have been described for the purpose of illuminating one or more of the potential ways in which the specific features and/or elements of the attached claims fulfill the requirements of uniqueness, utility and non-obviousness.

Use of the phrases and/or terms such as but not limited to "a first embodiment," "a further embodiment," "an alternate embodiment," "one embodiment," "an embodiment," "multiple embodiments," "some embodiments," "other embodiments," "further embodiment", "furthermore embodiment", "additional embodiment" or variants thereof do NOT necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or alternatively in the context of more than one embodiment, or further alternatively in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore should NOT be necessarily taken as limiting factors to the attached claims. The attached claims and their legal equivalents can be realized in the context of embodiments other than the ones used as illustrative examples in the description below.

Figure 1B:
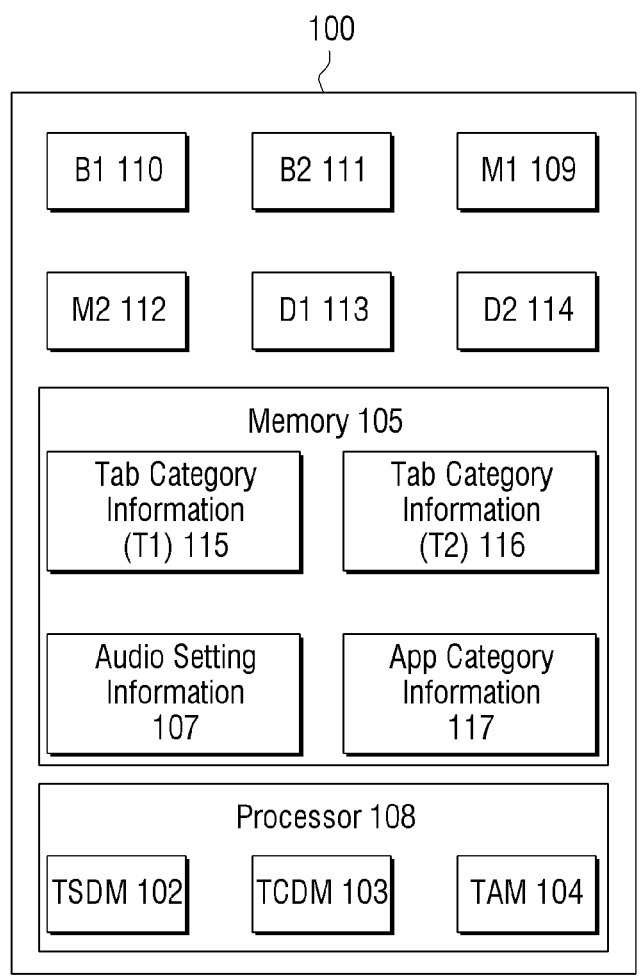

FIGS. 1A and 1B illustrate a device 100 for audio management in multiple tabs of one or more web browsers, in accordance with an embodiment of the present disclosure. Examples of the device 100 include, but not limited to, smartphone, desktop, notebook, smart TV, personal computer (PC), a tablet PC, a personal digital assistant (PDA), a palmtop computer, a laptop computer, and any other electronic device having one or more web browsers or browsing applications (hereinafter referred to as browsers). The device 100 includes one or more browsers. According to the present disclosure, the browser(s) support multi-tabbed browsing. In one example, the browsers can be pre-installed/downloaded in the device 100 at the time of manufacturing the device 100, as known in the art. In another example, a user can install/download the browsers in the device 100, as known in the art. Further, the device 100 is communicatively coupled with multiple servers (not shown in the figure) over a network (not shown in the figure) to obtain content requested through the browsers.

Referring to FIG. 1A, the device 100 includes a display 101 to display graphical user interfaces (GUIs) or windows of web browser(s) (hereinafter interchangeably referred to browser). Examples of the display 101 include, but not limited to, liquid crystal display (LCD), an organic light emitting diode (OLED), a flat panel display, and a solid state display. The device 100 further includes a tab switching detection module (TSDM) 102, tab category detection manager (TCDM) 103, and tab audio manager (TAM) 104.

In accordance with the present disclosure, the TSDM 102 detects switching from a first tab to a second tab displayed on the GUIs through the display 101. The switching can be detected between tabs available on single window or on different windows of same browser or on different windows of different browsers. The switching can be detected upon opening a new tab, switching to an already opened tab, closing the already opened tab, or reopening a closed tab.

Thus, in one scenario, a user has already opened only the first tab as current or active tab on the display 101. In one implementation, the TSDM 102 detects switching from the first tab to the second tab when the user opens the second tab as a new tab. In an example, the user opens the new tab upon 'right click' of the mouse. In another example, the user opens the new tab upon receiving specific combination of key strokes such as CTRL+N from a keyboard coupled to the device 100. In one another example, the user opens the new tab upon accessing a link or uniform resource locator (URL) in the first tab. In another implementation, the TSDM 102 detects switching from the first tab to the second tab when the user reopens the second tab, which was closed previously, as a new tab.

In another scenario, a user has already opened both the first tab as current or active tab and the second tab as inactive tab. In one implementation, the TSDM 102 detects switching from the first tab to the second tab when the user switches from the current tab to the inactive tab making the second tab as the current tab and the first tab as the inactive tab. In another implementation, the TSDM 102 detects switching from the first tab to the second tab when the user closes the second tab. As would be understood, the first tab and the second tab need not be consecutive tabs in either of the implementations.

Typically, a browser includes a browser tab manager for managing multiple tabs and a browser tab-event handler that captures any user activity regarding the browsers and corresponding tabs such as opening new tab(s), closing tab(s), reopening tab(s), and switching between tabs and user activity within the tabs. Examples of such user activity include, but not limited to, playing a paused audio, playing a new video having audio, pausing a streaming video having audio, and pausing a streaming audio. In accordance with the present disclosure, when the user performs any activity as mentioned above, the browser tab-event handler and the browser tab manager send information to the TSDM 102 that detects the switching and determines if the switched tab or the second tab is new tab or previous one, as described above.

After detecting the switching between the first tab and the second tab, the TCDM 103 determines a category of the second tab. The category of tab can be either an audio producing tab, i.e., the tab streams/plays/produces (hereinafter referred interchangeably) audio content (including a case of playing audio content only and a case of playing audio content and video content together), or non-audio producing tab, i.e., the tab does not stream any audio content but can stream any other content such as text, video, image, and animation. The TCDM 103 determines the category by various techniques. In one technique, the TCDM 103 determines the category by parsing a document object model (DOM) of the second tab. In one example, the TCDM 103 determines the category by checking presence of video/audio tag(s) in the DOM of the second tab. In another example, the TCDM 103 determines the category by checking presence of 'autoplay' attribute in the video/audio tag(s).

Thus, the TCDM 103 determines the category as audio producing tab if video/audio tag(s) and/or if the auto play attribute is present.

In another technique, the TCDM 103 determines the category by detecting a user event/activity in already opened tabs. Examples of such user activity include, but not limited to, playing a paused audio, playing a new video having audio, pausing a streaming video having audio, and pausing a streaming audio. In one example, the TCDM 103 determines the category when the user pauses a streaming audio in a current tab. In another example, the TCDM 103 determines the category when the user plays a paused audio in the current tab.

In another technique, the TCDM 103 determines the category by monitoring behaviour of the second tab. In such technique, the TCDM monitors invocation of a system media player or a media player plugin from the second tab. Thus, the TCDM 103 determines the category as audio producing tab upon invocation of the system media player or the media player plugin.

In one another technique, the TCDM 103 determines the category based on presence of advertisement tag in metadata associated with web page in the second tab. In still one another technique, the TCDM 103 determines the category based on an advertisement server hosting the advertisement on the web page in the second tab. Thus, the TCDM 103 determines the category as non-audio producing tab if the advertisement tag is present or when the advertisement server is contacted for advertisement.

In yet another technique, the TCDM 103 determines the category based on presence of web page opened in the second tab in browser history or bookmarks of the one or more web browsers.

In still another technique, the TCDM 103 determines the category by determining a status of audio content or packets received from a network. In an example, when a user opens a web page in one tab of a browser, the browser sends a request to server hosting the web page. The server responds with streaming contents or packets over a network. The TCDM 103 evaluates the response content. If the response content is an audio content, the TCDM 103 categorizes the tab as audio producing tab.

In yet one another technique, the TCDM 103 determines the category by evaluating a URL of a webpage opened in the second tab or meta data of said webpage or content of said webpage. Thus, the TCDM 103 determines the category as audio producing tab if the evaluation indicates the webpage includes audio content. In an example, when a user opens a web page in one tab of a browser, the browser sends a request to server hosting the web page. The server responds with requested URL of the web page and the browser sends the response received from server to web engine. Accordingly, the web engine evaluates the response to determine presence of any audio content in the web page. Thus, if the response only includes text, the web engine displays the text on the web page and consequently sends a signal to the TCDM 103 that response does not contain any audio content. Based on the signal received from the web engine, TCDM 103 categorizes that tab as non-audio producing tab. On the contrary, if the web engine detects a media segment in the response, the web engine further evaluates the media segment to determine presence of audio content. If the media content includes audio content, the web engine sends a signal to the TCDM 103 that response contains audio. Based on the signal received from the web engine, TCDM 103 categorizes that tab as audio producing tab.

In addition, the TCDM 103 determines the category of the second tab as audio producing tab when the second tab plays/streams/produces a user desired audio such as music, animation, and audio stories. However, any audio emanating from advertisement content is either considered or not considered as the user desired audio based on user settings. The user can provide such settings via a user-interface. In one example, the user-interface corresponds to an advanced audio management settings page of settings application available on the device 100.

Accordingly, FIG. 2 illustrates an example user-interface 200 corresponding to the advanced audio management settings page. The user interface 200 may be displayed on the display 101. In the meantime, FIG. 2 illustrates that several options are provided by one user-interface 200, but according to still another exemplary embodiment, there are a plurality of user-interfaces and each of the plurality of user-interfaces may include at least one of the options. The user-interface 200 provides an option 201 to enable smart browser audio management for advertisements. When the option 201 is enabled, audio emanating from advertisement content in tab is not considered as 'user desired audio'. Consequently, such tab is categorized as non-audio producing tab such that audio from the tab is always muted. On the contrary, when the option 201 is disabled, audio emanating from advertisement content in tab is considered as 'user desired audio'. Consequently, such tab is categorized as audio producing tab such that audio from the tab is controlled in a manner similar to other audio producing tabs. The user can enable the option 201 (represented by tick mark) in a manner as known in the art.

Further, upon detection of the category, the TCDM 103 saves the determined category of the second tab in a memory 105 as tab category information 106. The TCDM 103 may keep the track of all opened tabs and category of the tabs (audio producing tab/non-audio producing tab). When any tab switching occurs, the tab category information 106 is updated. The tab category information 106 includes details about tabs such as name/description of tab, status of tab, and corresponding determined category. Status of the tab is indicative of whether the tab is current/active/in foreground or not and whether the tab is currently playing/streaming audio or not. The tab category information 106 can be stored in a tabular form as illustrated in below table 1. It would be understood, that colour coding or any other technique can be used to optimize the below table.

TABLE 1

| S. No. | Description of Tab | Category of Tab | Status of Tab |
|---|---|---|---|
| 1 | Video123.com\|videoX1 | Audio Producing Tab | Inactive & Not playing audio |
| 2 | Video123.com\|videoY1 | Audio Producing Tab | Inactive & Not playing audio |
| 3 | Emailwert.com | Non-Audio Producing Tab | Inactive |
| 4 | AudioVideo223.com\|videoAB1 | Audio Producing Tab | Inactive & Currently playing audio |
| 5 | Newsabc.com\|art123 | Non-Audio Producing Tab | Inactive |
| 6 | Storygo.com\|art345 | Non-Audio Producing Tab | Current/ Active |

Further, the tab category information 106 of a tab is retained even after the tab or corresponding browser session is closed. The tab category information 106 is retained in a manner similar to retaining or saving browser session. This enables the TCDM 103 to determine category of a tab, which was previously closed. Thus, when the TSDM 102 determines the second tab is a previously closed tab, the TCDM 103 fetches the tab category information 106 from the memory 105 to determine the category of the second tab. On the contrary, when the TSDM 102 determines the second tab is a new tab, the TCDM 103 determines the category as described above and updates the tab category information 106 accordingly.

Further, the TCDM 103 resolves a priority conflict between other application(s) and browsers capable of streaming/playing/producing audio and tabs capable of streaming audio. Examples of such applications include, but not limited to, system media player and media player plugin. In one example, a user can open multiple applications and tabs successively to listen to music or to view videos. The priority conflict can be resolved based on a priority set by the user via a user-interface.

Accordingly, referring to FIG. 2 again, the user-interface 200 provides an option 202 to enable smart browser audio management in one of single browser (multiple window/ tabs), multiple browsers, and multiple applications. This option allows the user to opt for setting smart audio management feature in a single browser, between multiple browsers or between multiple applications.

The user-interface 200 further provides an option 203 to enable setting of any current audio producing tab as audio playing tab or relevant tab when multiple tabs and/or applications are playing audio content. When the option 203 is enabled, the user can set any current audio producing tab as audio playing tab. Such tab will be given highest priority over other audio producing tabs and other applications streaming audio during audio control. The user can enable the option 203 (represented by tick mark) in a manner as known in the art. In a similar manner, the option 203 enables setting of any other applications streaming audio as audio playing tab or relevant tab when multiple tabs and/or applications are playing audio content. Such application will be given highest priority over other audio producing tabs and other applications streaming audio during audio control.

The user-interface 200 further provides text field 204 to identify website(s) for which audio should be kept on. The user can add the website(s) in a manner as known in the art. Such website(s) is given highest priority during switching and audio will not be controlled when a switched website is a low priority website.

The above-mentioned settings are stored in the memory 105 as audio setting information 107.

Further, in one implementation, the TCDM 103 can determine the category periodically such as after few seconds. In another implementation, the TCDM 103 can determine the category when a web page in the second tab is loaded. In one another implementation, the TCDM 103 can determine the category when a user event/activity is detected in said web page. Examples of the user event include, but not limited to, playing a paused audio, playing a new video having audio, pausing a streaming video having audio, and pausing a streaming audio. In yet one another implementation, the TCDM 103 can determine the category when a new tab auto-plays any audio present in the new tab. It would be understood that the TCDM 103 determines the category of the first tab in a similar manner to enable automatic audio control.

Upon determination of the category, the TAM 104 controls audio of the first tab and/or the second tab and/or any further tab based on the determined category. Accordingly, the TAM 104 fetches category of the first tab and the second tab from the memory 105 and based on the category controls the audio. The controlling of the audio includes muting or unmuting the audio or changing at least one parameter of the audio. The at least one parameter can be volume, pitch, audio language, tempo, and speed. In addition, the at least one parameter of the audio can be changed with transition effect. In one implementation, the user can pre-set a percentage of volume reduction via a user-interface. In one implementation, as described above, the user-interface corresponds to an advanced settings page of settings application available on the device 100.

Referring to FIG. 2 again, the user-interface 200 provides an option 205 to manage audio properties of audio producing tab during switching. The audio properties include, but not limited to, volume, pitch, audio language, tempo, and speed. The user can select any one of the option (represented by tick mark) in a manner as known in the art. In addition, the user-interface 200 provides an option 206 to select percentage of volume reduction such as 20%, 25%, 40%, 50%, 60%, and 80%, when 'volume' is selected as audio property. The user can enable the option 206 (represented by tick mark) in a manner as known in the art. Further, the user-interface 200 provides option 207 to enable audio indication over the tabs. When the option 207 is enabled, an audio indication such as an icon is provided on a tab to indicate whether the tab is audio producing tab or non-audio producing tab, and whether audio is currently being played from the tab or not.

The above-mentioned settings can be stored in the memory 105 as the audio setting information 107.

Thus, in accordance with the present disclosure, the switching from the first tab to the second tab or any further tab can be of four types:
  audio producing tab to audio producing tab;
  audio producing tab to non-audio producing tab;
  non-audio producing tab to audio producing tab; and
  non-audio producing tab to non-audio producing tab.

As described earlier, the switching of tabs can be detected between tabs available on single window of a browser or on different windows of same browser or on different windows of different browsers.

Based on the type of switching, a determination is made to play/stream audio of any tab and adjust audio parameter accordingly. Thus, in one implementation, the category of the first tab is an audio producing tab and the category of the second tab is determined as an audio producing tab. In such implementation, the audio of the first tab is controlled by way of muting the audio.

In another implementation, the category of the first tab is an audio producing tab and the category of the second tab is determined as a non-audio producing tab. In such implementation, the audio of the first tab is controlled by way of changing at least one parameter of the audio of the first tab based on content of the second tab. In a similar manner, audio of the further tab is muted.

In one another implementation, the category of the first tab is a non-audio producing tab and the category of the second tab is determined as an audio producing tab. In such implementation, the audio of the second tab is played/streamed. In a similar manner, audio of the further tab is muted if the further tab is an audio producing tab.

In yet another implementation, the category of the first tab is a non-audio producing tab and the category of the second tab is determined as a non-audio producing tab. In such implementation, if the further tab is an audio producing tab then audio of the further tab is played. The audio of the further tab is controlled by way of muting or unmuting the audio or changing at least one parameter of the audio if any other further tabs capable of playing audio are opened.

In yet one another implementation, the category of the second tab is either audio producing tab or non-audio producing tab. Further, a determination is made if the second tab includes advertisement content. If the second tab includes advertisement content, the category of second tab is determined as non-audio producing tab. As described earlier, such determination is based on the user preferences provided via the user interface 200. Accordingly, the audio of the second tab is controlled by way of muting or unmuting the audio.

Furthermore, a link or uniform resource locator (URL) to the websites/web page of the second tab is saved in the memory 105 as the tab category information 106. The category of such tab is saved as non-audio producing tab, irrespective of whether status of tab is active or inactive. This enables the TCDM 103 to determine a tab having advertisement content as non-audio producing tab based on the link of web page in the tab without having to assess entire content of the web page.

Therefore, at any point of time audio content from a single source such as tab or application will be played/streamed even when multiple sources are opened in accordance with user's needs. This considerably improves user-experience.

Further, the TSDM 102 detects switching by detecting if the second tab is current or active or in foreground and the first tab is inactive or in background. If the second tab is inactive or in background and the first tab is current or active or in foreground, the TSDM 102 detects switching has occurred. Accordingly, the TAM 104 controls audio of the second tab by muting audio from the second tab while playing audio from either the first tab or any other tab currently playing the audio. In addition, the TCDM 103 may determine the category of the first tab and/or the second tab again, as described above.

In an example, the user opens the new tab capable of streaming audio upon 'right click' of the mouse from a current tab. In such example, the new tab remains in background and therefore the TAM 104 mutes audio from the new tab. In another example, the user restores a previously closed browser session having multiple tabs capable of streaming audio. In such example, the TCDM 103 fetches previously stored category and status of the multiple tabs based from the tab category information 106. The TAM 104 mutes audio from all tabs except from a current tab of the restored browser session based on the determined category and status.

In one another example, the user opens the new tab capable of streaming audio upon accessing a link from a current tab. In such example, the new tab is in background and therefore TAM 104 mutes audio from the new tab. However, the TCDM 103 again determines the category of the current tab and the new tab based on user event or expiry of predetermined time. Examples of the user-event include, but not limited to, playing a different audio from the current tab and pausing audio from the current tab. Consequently, the TAM 104 controls audio of the tabs and any further tab. This eliminates need for performing manual activities such as muting or pausing audio from each tab by the user and as such further enhances user-experience.

Further, as described above, in one implementation, the switching of tabs can be detected between tabs available on single window of a browser or on different windows of same browser or on different windows of different browsers. As such, the TSDM 102, the TCDM 103, and the TAM 104 can be implemented within a browser. In such implementation, the TCDM 103 can save the determined category of each tab of each browser in one table or in different tables.

Further, referring to FIG. 1A, the device 100 includes a processor 108 to perform various functions of the device 100. The processor 108 can be a central processing unit (CPU), a graphics-processing unit (GPU), or both. The processor 108 may be implemented in the device 100 as one or more general processors, digital signal processors, application specific integrated circuits (ASIC), field programmable gate arrays, servers, networks, digital circuits, analog circuits, combinations thereof, or other now known or later developed devices for analysing and processing data. In one implementation, TSDM 102, the TCDM 103, and the TAM 104 can be implemented as part of or integral to the processor 108. In one implementation, TSDM 102, the TCDM 103, and the TAM 104 can be implemented as external to the processor 108, as illustrated in FIG. 1A.

Further, as described earlier, in one implementation, the switching can be detected between multiple applications such as browser, media application, and document application. As such, the TSDM 102, the TCDM 103, and the TAM 104 is implemented as part of or integral to the processor 108 and specifically as part of operating system. This configuration allows the TSDM 102, the TCDM 103, and the TAM 104 to operate on application level in addition to tab level.

Accordingly, FIG. 1B illustrates the device 100 having an active application as a media playing application (M1) 109. The device 100 further includes inactive applications as the first browser (B1) 110, the second browser (B2) 111, a media playing application (M2) 112, a drawing application (D1) 113, and a document application (D2) 114. The memory 105 includes tab category information (T1) 115 corresponding to the first browser (B1) 110 and tab category information (T2) 116 corresponding to the second browser (B2) 111. However, the user-settings as saved in the audio setting information 107 (that were received via the user-interface 200) will be applicable equally for the all the applications.

In addition to the tab category information (T1) 115 and the tab category information (T2) 116, the memory 105 includes application category information 117. The application category information 117 includes details about application such as name/description of application, status of application, and corresponding determined category. The application category information 117 can be stored in a tabular form as illustrated in below table 2. It would be understood, that colour coding or any other technique can be used to optimize the below table.

TABLE 2

| S. No. | Description of Application | Category of Application | Status of Application |
|---|---|---|---|
| 1 | Media playing application (M1) | Audio Producing | Active |
| 2 | Browser (B1) | Audio Producing | Inactive |
| 3 | Browser (B2) | Non-Audio Producing | Inactive |
| 4 | Media playing application (M2) | Audio Producing | Inactive |
| 5 | Drawing application | Non-Audio Producing | Inactive |

TABLE 2-continued

| S. No. | Description of Application | Category of Application | Status of Application |
|---|---|---|---|
| 6 | Document application | Non-Audio Producing | Inactive |

Further, in one another implementation, the TSDM 102, the TCDM 103, and the TAM 104 can be implemented as hardware unit/modules. In yet another implementation, TSDM 102, the TCDM 103, and the TAM 104 can be implemented as software unit/modules. In an example of such implementation, the TSDM 102, the TCDM 103, and the TAM 104 can be implemented within a new version of a browser. In another example of such implementation, the TSDM 102, the TCDM 103, and the TAM 104 can be implemented as new plug-in to an old or existing version of the browser. In one another example of such implementation, the TSDM 102, the TCDM 103, and the TAM 104 can be implemented as mobile or web application that can be installed or downloaded onto the device 100.

In still one another implementation, TSDM 102, the TCDM 103, and the TAM 104 can be implemented as combination of hardware and software unit/modules. In yet another implementation, the TSDM 102, the TCDM 103, and the TAM 104 can be a single unit. In one another implementation, the TSDM 102, the TCDM 103, and the TAM 104 can de different units, as illustrated in FIG. 1A. In another implementation, any two of the TSDM 102, the TCDM 103, and the TAM 104 can be implemented as single unit, while the other unit can be implemented as different unit. In still another implementation, the TSDM 102, the TCDM 103, and the TAM 104 can include further modules to perform various functions in accordance and within the scope of the present disclosure.

Further, the memory 105 may be a main memory, a static memory, or a dynamic memory. The memory 105 may be volatile and non-volatile memory, including but not limited to random access memory, read-only memory, programmable read-only memory, electrically programmable read-only memory, electrically erasable read-only memory, flash memory, magnetic tape or disk, optical media, hard drive, memory card, floppy, and any other component capable of storing data. In one implementation, the memory 105 can be internal to the device 100, as illustrated in FIG. 1A. In another implementation, the memory 105 can be external to the device 100.

The device 100 may further include a communication interface unit (not shown in the figure) to communicatively couple with other devices and/or servers over a network. The network can be wired network and wireless network. The communication interface unit may be formed to connect the device 100 to an external device (not shown), and may be connected to the external device via a local area network (LAN) and an Internet network as well as by a mobile communication scheme (e.g., global system for mobile communications (GSM), universal mobile telephone system (UMTS), long-term evolution (LTE), wireless broadband (WiBRO), or the like). The device 100 may further include input/output unit(s) (not shown in the figure) configured to allow the user to interact with any of the units of the device 100. In one implementation, the display 101 can be the input/output unit. Example of such display 101 includes but not limited to touch screen display. The various units of the device 100 can communicate via a bus (not shown in the figure). Although, the illustration depicts specific units, it would be understood that the device 100 and the units therein might include various software and/or hardware components or modules as necessary for implementing the disclosure.

For the ease of understanding, the forthcoming descriptions of FIGS. 3A to 6 illustrates various example implementation manifestations of the disclosure as described above in reference to FIG. 1. However, it may be strictly understood that the forthcoming examples shall not be construed as being limitations towards the present disclosure and the present disclosure may be extended to cover analogous manifestations through other type of like mechanisms.

FIGS. 3A-3H illustrate a first example manifestation for audio management in multiple tabs of a browser, in accordance with an embodiment of the present disclosure. In the example, the GUI 300 is a window of a browser having one or more tabs. As would be understood, when a browsing tab is selected or activated or is in foreground, content associated with the browsing tab is visible. When a browsing tab is not selected or not active or in background, the content associated with the browsing tab (hereinafter interchangeably referred to as tab) is hidden. For the sake of brevity and clarity, only one GUI of one browser is illustrated. The foreground tab is represented by dotted pattern and the background tab is represented by slanted line pattern. In addition, reference numeral 1 on a tab represents the tab is a current tab and reference numeral 2 on a tab represents the tab is switched. Additionally, a directional arrow represents a switching between a current tab and other tab.

Figure 3A:
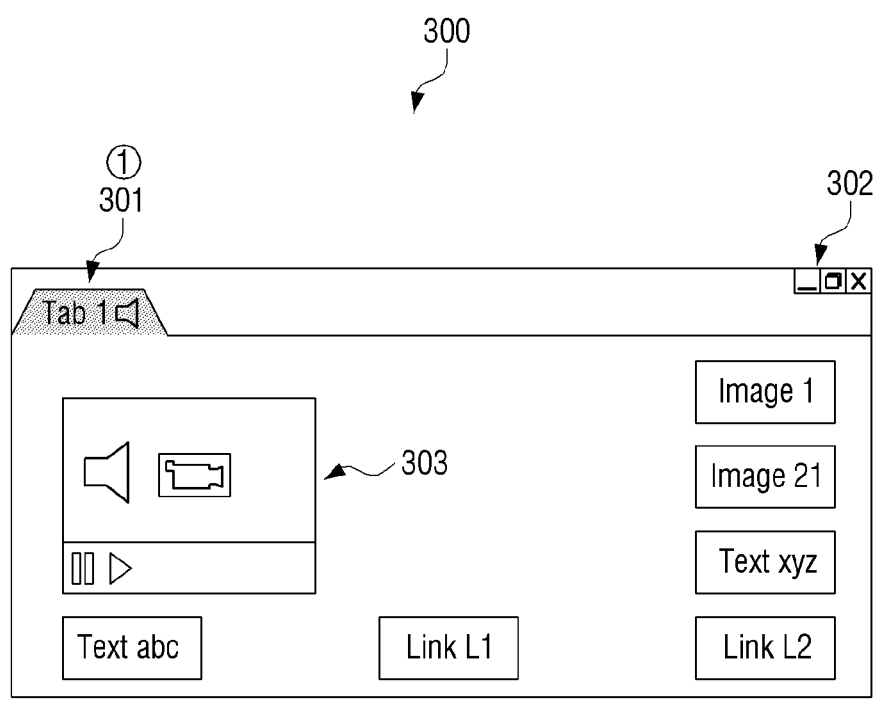
FIGS. 3A-3H illustrate a first example manifestation for audio management in multiple tabs of a browser, in accordance with an embodiment of the present disclosure.

Referring to FIG. 3A, the GUI 300 includes a first tab 301 (or Tab 1) as an active tab and browser controls 302. The first tab 301 is an audio producing tab, i.e., the first tab 301 plays audio content (represented by a speaker icon). The first tab 301 may display a multimedia content player 303 having media controls and playing multimedia content having audio. The first tab 301 may also display other content such as images, links or URLs, and text.

Figure 3B:
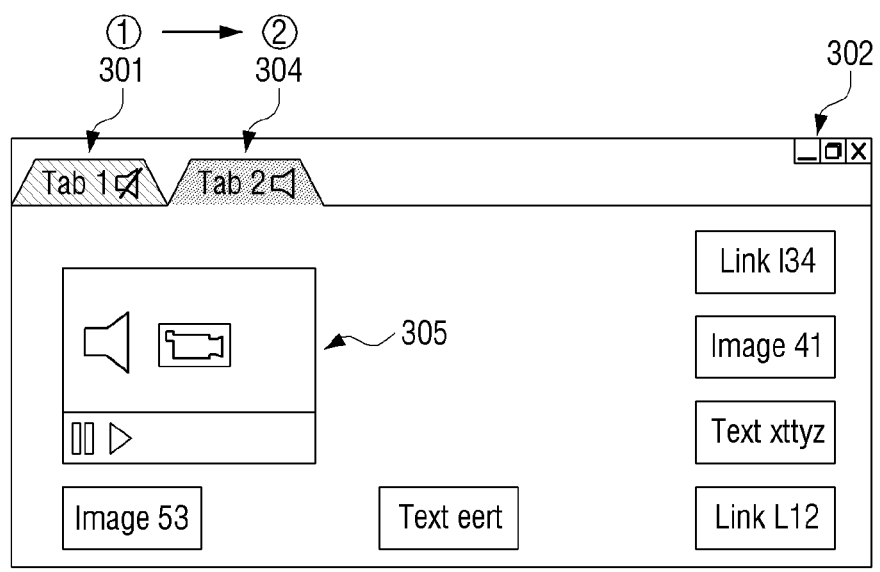

Referring to FIG. 3B, a user opens a second tab 304 (or Tab 2) on the browser. The second tab 304 is an audio-producing tab, i.e., the second tab 304 plays audio content, (represented by a speaker icon). The second tab 304 may display a multimedia content player 305 having media controls and playing multimedia content having audio. The second tab 304 may also display other content such as images, links or URLs, and text. Accordingly, the first tab 301 is in background and the second tab 304 is in foreground.

The TSDM 102 detects the switching is from the first tab 301 to the second tab 304 and that the switching is between a currently open tab and a new tab. The TCDM 103 determines the category of the second tab 304 as audio producing tab. As described earlier, the TCDM 103 determines the category of the second tab 304 as audio producing tab after excluding audio from any advertisement content. Based on the determined category, the TAM 104 mutes audio of the first tab 301 (represented by a mute icon) while playing the audio of the second tab 304 (represented by the speaker icon).

As described earlier, when each of the tabs i.e. first tab 301 and second tab 304, are opened as new tabs, the TCDM 103 updates tab category information 106 corresponding to each of the tabs. As such, when the user switches between the already opened tabs, the TAM 104 fetches the tab category information 106 from the memory 105 to determine the category and control/manage audio accordingly. Thus, when the user selects the first tab 301 again, the TSDM 102 detects the switching is from the second tab 304 to the first tab 301 and that the switching is between a currently open tab and a previously opened tab. As such, the TAM 104 fetches the tab category information 106 from the memory 105. The TAM 104 determines the category of the first tab 301 as audio producing tab and category of the second tab 304 as audio producing tab from the tab category information 106. Accordingly, the TAM 104 mutes the audio of the second tab 304 while playing the audio of the first tab 301.

Figure 3C:
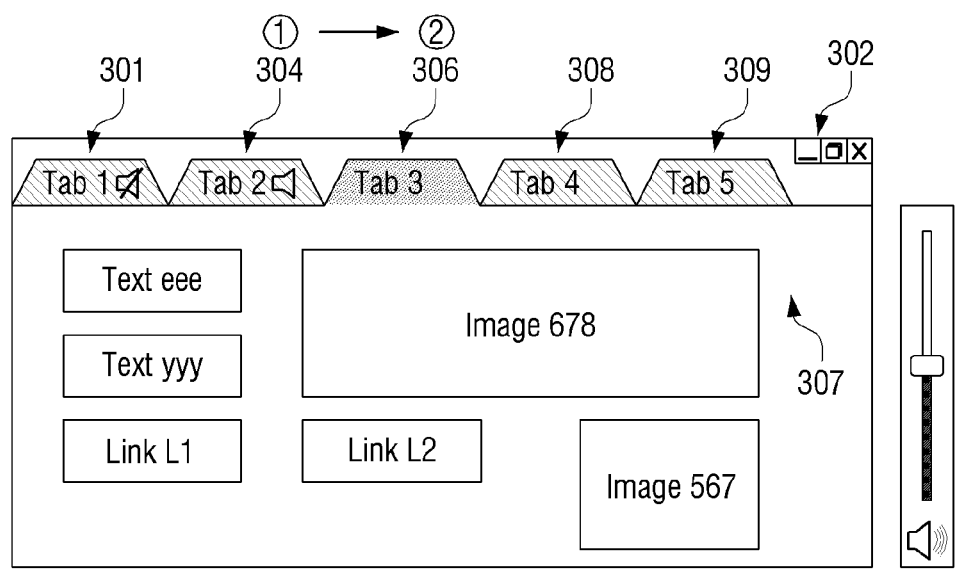
Figure 3D:
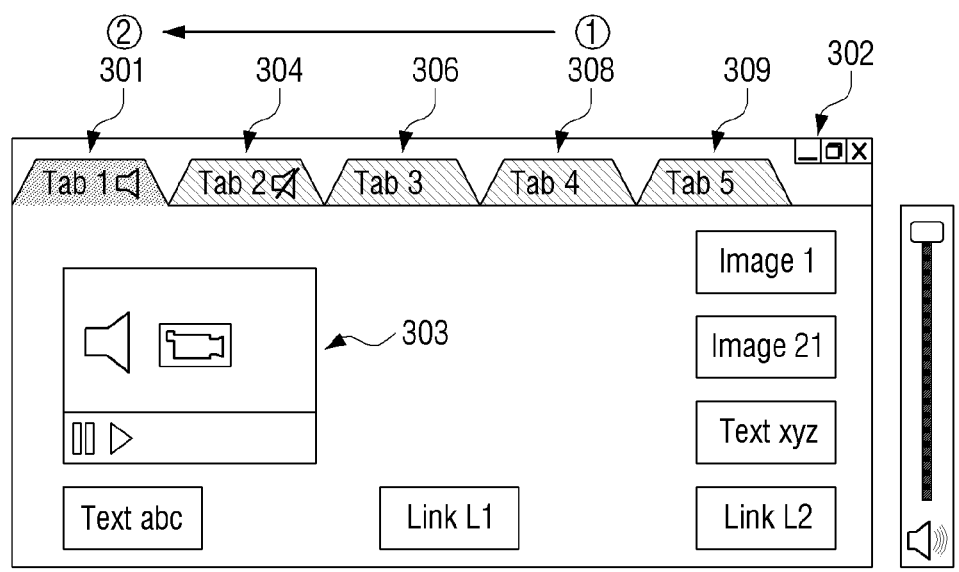

Referring to FIG. 3C, the user opens a further tab 306 (or Tab 3) on the browser. The further tab 306 is a non-audio producing tab, i.e., the further tab 306 does not include any audio content but can include any other content such as text, link or URL, image, video, and animation. In the example, the further tab 306 corresponds to a web page of an e-newspaper and displays content 307 including text and images. Accordingly, the second tab 304 is in background and the further tab 306 is in foreground.

The TSDM 102 detects the switching is from the second tab 304 to the further tab 306 and that the switching is between a currently open tab and a new tab. The TCDM 103 determines the category of the further tab 306 as non-audio producing tab. As such, the TAM 104 continues playing the audio of the second tab 304 (represented by a speaker icon) while muting the audio of the first tab 301 (represented by the mute icon). Further, the TAM 104 may decrease a volume of the audio of the second tab 304 (represented by a volume control panel indicating volume at 50%) to enable the user to listen audio from the second tab 304 and simultaneously read content 307 of the further tab 306. In addition, the TAM 104 may either enable the user to or automatically lower pitch of the audio of the second tab 304. It would be understood, the reduction in volume might not be performed if corresponding web page of the second tab 304 is in the preferred websites. In another example, the TAM 104 may mute the volume of the second tab 304. Thus, the audio parameters are adjusted based on tab switching, user specified websites, user interest, user preference, and metadata associated with the tabs. As would be understood, the TCDM 103 determines the category either during run time or after a web page in the further tab 306 is fully loaded.

Further, the user may open further tabs (308, 309) (or Tab 4, Tab 5) as new tabs, which are non-audio producing tabs. Accordingly, the TAM 104 continues playing the audio of the second tab 304 (represented by a speaker icon) while muting the audio of the first tab 301 (represented by the mute icon), as described above.

Referring to FIG. 3D, the user may again select the first tab 301 while the further tab 308 is in foreground such that the first tab 301 comes in foreground and the further tab 308 goes in background. The TSDM 102 detects the switching is from the further tab 308 to the first tab 301 and that the switching is between a currently open tab and a previously opened tab. As such, the TAM 104 fetches the tab category information 106 from the memory. The TAM 104 determines the category of the first tab 301 as audio producing tab and category of the further tab 308 as non-audio producing tab based on the tab category information 106. Accordingly, the TAM 104 mutes the audio of the second tab 304 (represented by the mute icon) while playing the audio of the first tab 301 (represented by a speaker icon). Further, the TAM 104 may increase a volume of the audio of the first tab 301 (represented by a volume control panel indicating volume at 100%).

The user may now select the further tab 306 while the first tab 301 is in foreground such that the first tab 301 goes in background and the further tab 306 comes in foreground.

The TSDM 102 detects the switching is from the first tab 301 to the further tab 306 and that the switching is between a currently open tab and a previously opened tab. As such, the TAM 104 continues playing the audio of the first tab 301 while muting the audio of the second tab 304, as described above.

Figure 3E:
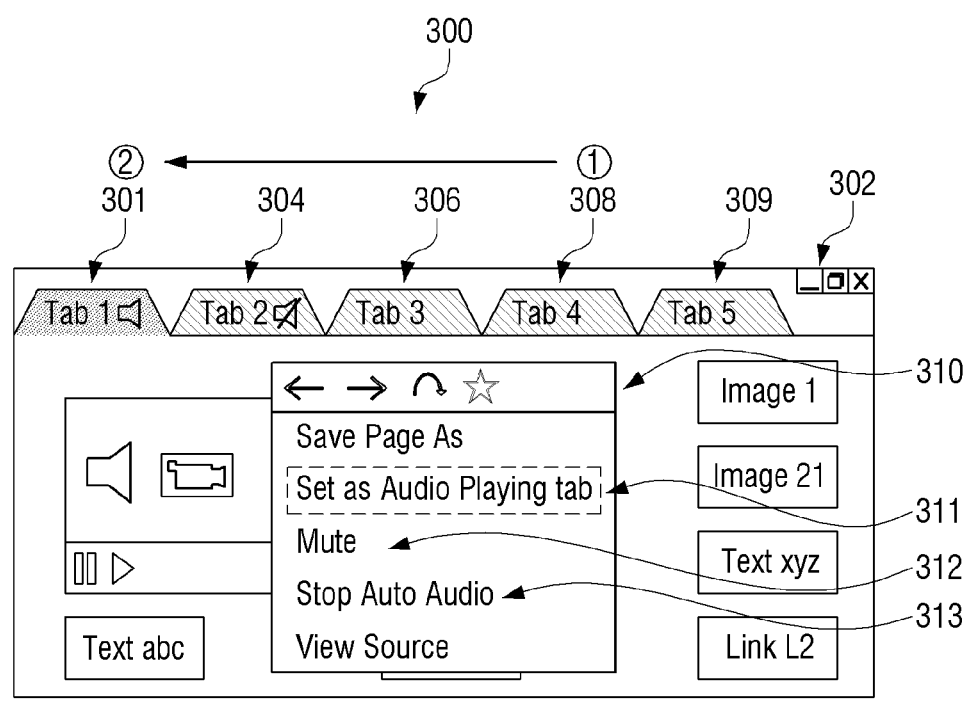

Referring to FIG. 3E, the user can set the first tab 301 as audio playing tab or relevant tab through a user-interface 310 provided/displayed within the first tab 301. In an example, the user-interface 310 can be displayed upon accessing a control button (not shown in the figure) provided on the GUI 300. In another example, the user-interface 310 can be displayed upon 'right-click' of a mouse on the GUI 300. In one another example, the user-interface 310 can be displayed upon accessing an icon on the GUI 300. The user-interface 310 provides an option 311 to set a current tab as audio playing tab. Upon accessing the option 311 (represented by dashed rectangle), the first tab 301 is set as audio playing tab and the information is stored as the audio setting information 107 in the memory 105. The user-interface 310 may include options for controlling underlying web page such as save page and view source.

Thus, when the user switches from the first tab 301 to the second tab 304, the TAM 104 mutes the audio of the first tab 301 while playing the audio of the second tab 304, as described above.

Figure 3F:
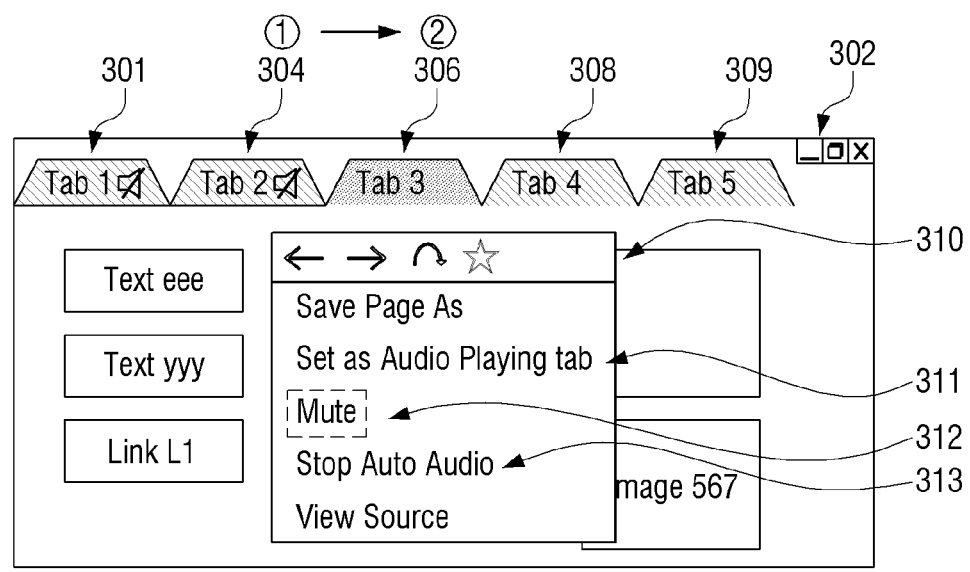

However, referring to FIG. 3F, when the user switches from the second tab 304 to the further tab 306, The TSDM 102 detects the switching is from the second tab 304 to the further tab 306 and that the switching is between a currently open tab and a previously opened tab. As such, TAM 104 fetches the tab category information 106 and the audio setting information 107 from the memory 105. Upon fetching, the TAM 104 determines the category of the second tab 304 as audio producing tab and category of the further tab 306 as non-audio producing tab based on the tab category information 106. The TAM 104 further determines the first tab 301 is set as audio playing tab from the audio setting information 107 and accordingly mutes the audio of the second tab 304 while playing the audio of the first tab 301. It would be understood that any other audio producing tab may be set as the audio playing tab after setting the first tab 301 as the audio producing tab.

A still another example of option 311 to set a current tab as audio playing tab will be described. When a user opened multiple audio tabs to select one of favourite music, and then the user traversed from Tab1→Tab2→Tab3→Tab4. Tab1 is audio producing tab, when the user switched to Tab2 (audio producing tab), Tab2 will play audio content and Tab1 will be mute. Now, the user sets Tab2 as audio playing tab using option 311 provided within Tab2. When the user switched to Tab3 (audio producing tab), Tab3 will play audio content and Tab2 will be mute. But, when the user switches to Tab 4 (non-audio producing tab), then browser will not play Tab3, instead, will play Tab2 as the user manually set Tab2 as the audio playing tab.

Further, the user can mute audio of any tab currently playing the audio from any other tab and disable the automatic audio control/management feature. Accordingly, the user interface 310 provides an option 312 to mute and an option 313 to stop auto audio.

Referring to FIG. 3F again, the user can access the user-interface 310 within the further tab 306. Using the option 312, the user can mute audio of the first tab 301 from the further tab 306, without having to switch to the first tab 301 again. Upon accessing the option 312 (represented by dashed rectangle), the TAM 104 mutes the audio of the first tab 301 (represented by mute icon).

Further, using the option 313, the user disables the auto audio control/management feature. Thus, upon enabling the option 313, the TAM 104 does not mute the audio of the first tab while playing the audio of the audio producing tab when the user switches from the first tab 301 to any other audio producing tab.

Figure 3G:
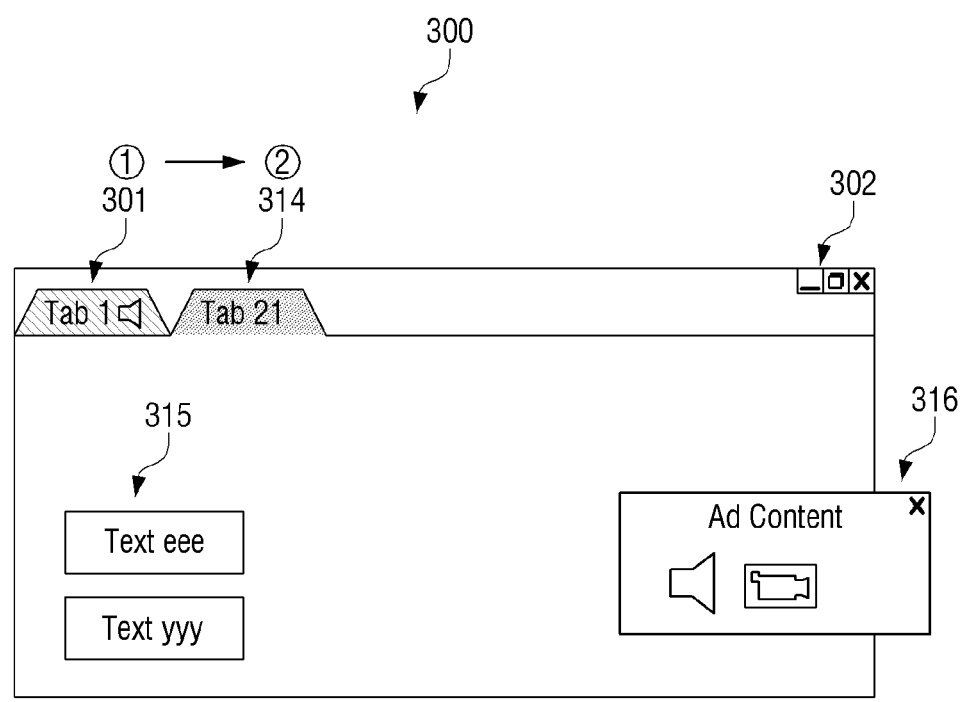
Figure 3H:
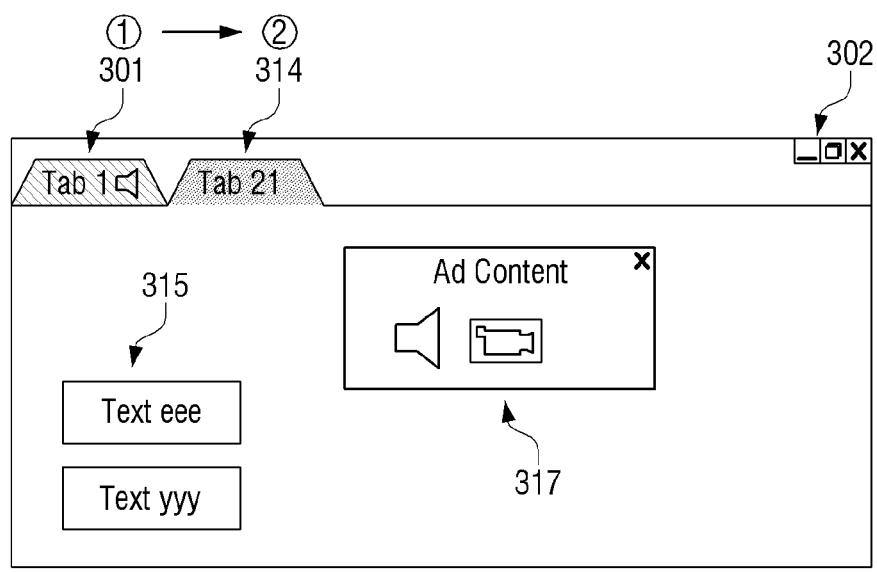

Referring to FIG. 3G and FIG. 3H, the user opens a further tab 314 (or Tab 21) on the browser. The further tab 314 is a non-audio producing tab, i.e., the further tab 314 does not include any audio content but can include any other content such as text, link or URL, image, video, and animation. In the example, the further tab 314 corresponds to a web page of an e-magazine and displays content 315 including text and images.

Accordingly, referring to FIG. 3A, FIG. 3G, and FIG. 3H, the further tab 314 is in foreground and the first tab 301 is in background. The TSDM 102 detects the switching is from the first tab 301 to the further tab 314 and that the switching is between a currently open tab and a new tab. The TCDM 103 determines the category of the further tab 314 as non-audio producing tab.

However, the further tab 314 also plays an advertisement content having audio. Referring to FIGS. 3G and 3H, the advertisement content can be played/streamed in a pop-up window 316 or in a panel 317 within the further tab 314. As described earlier, the TCDM 103 does not consider the advertisement content having audio as 'user desired audio'. Therefore, the TAM 104 continues playing the audio of the first tab 301 (represented by a speaker icon).

Although, the above example illustrates the switching between consecutive tabs, the switching can take place between any non-consecutive tabs. Similarly, although the above example illustrates the first tab as audio producing tab, the first tab can be non-audio producing tab and audio will be controlled as explained above. The same is within the scope of the present disclosure.

Figure 4:
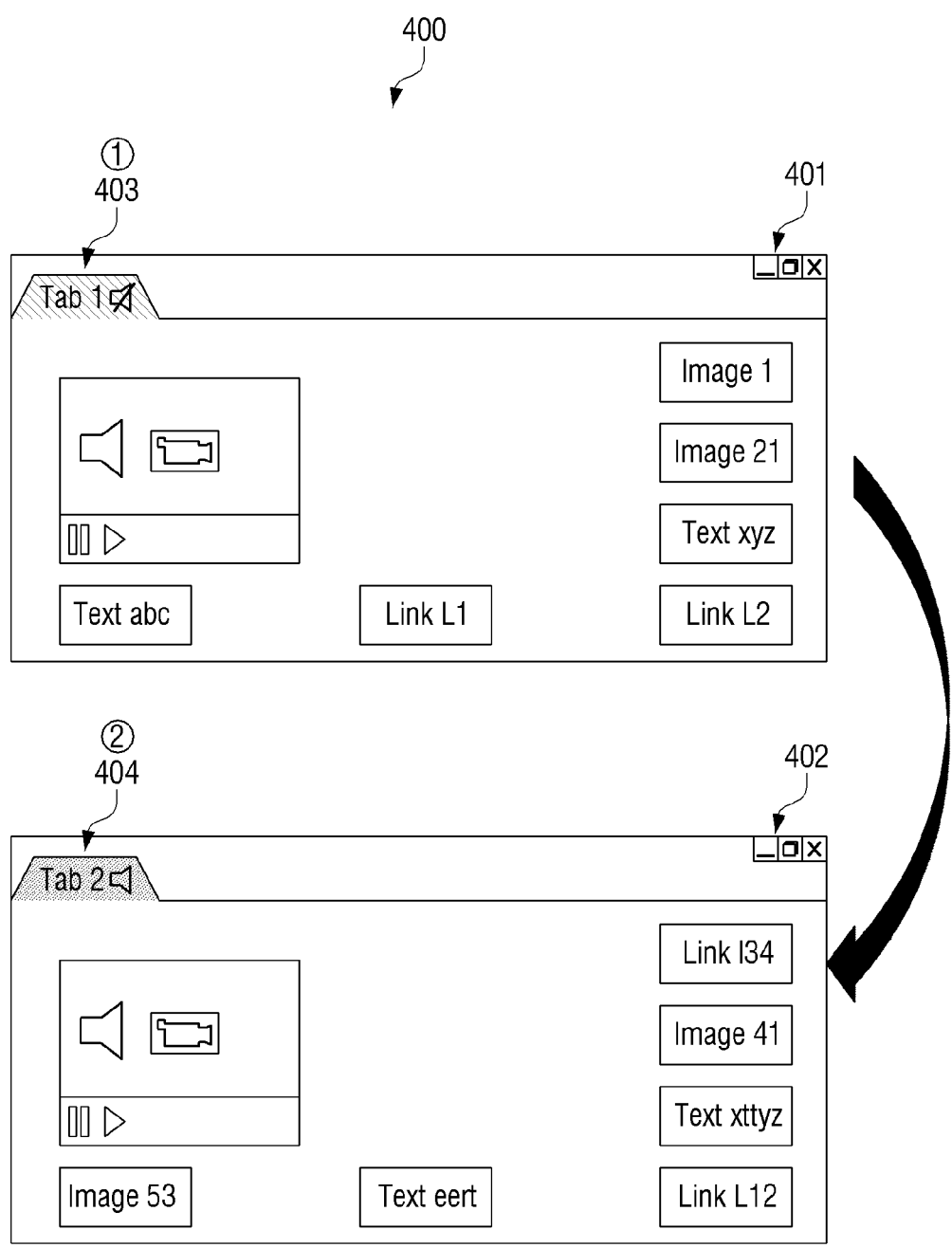
FIG. 4 illustrates a second example manifestation for audio management in multiple tabs of two web browsers, in accordance with an embodiment of the present disclosure.

FIG. 4 illustrates a second example manifestation 400 for audio management in multiple tabs of two web browsers, in accordance with an embodiment of the present disclosure. In the example, a graphical user interface (GUI) 401 is a window of a first browser and GUI 402 is a window of a second browser having one or more tabs. As would be understood, when a browsing tab is selected or activated or is in foreground, content associated with the browsing tab is visible. When a browsing tab is not selected or not active or in background, the content associated with the browsing tab (hereinafter interchangeably referred to as tab) is hidden. Alternatively, when size is adjusted so that GUI 401 of the first browser and GUI 402 of the second browser are displayed simultaneously on one screen, content of an inactive browser may be seen. For the sake of brevity and clarity, only one tab on each of the browsers is illustrated. The foreground tab is represented by dotted pattern and the background tab is represented by slanted line pattern. In addition, reference numeral 1 on tab represents the tab is a current tab and reference numeral 2 on a tab represents the tab is switched. Additionally, a directional arrow represents a switching between a current tab and other tab.

The GUI 401 includes a first tab 403 (or Tab 1) and the GUI 402 includes a second tab 404 (or Tab 2). The first tab 403 and the second tab 404 are audio-producing tabs, i.e., the first tab 403 and the second tab 404 plays audio content. The first tab 403 and the second tab 404 may display a multimedia content player having media controls and playing multimedia content having audio. The first tab 403 and the second tab 404 may also display other content such as images, links or URLs, and text.

The first tab can be active tab. When the user switches from the first tab 403 to the second tab 404, the TSDM 102 detects the switching. As described earlier, the TCDM 103 determines the category of the second tab 404 as audio producing tab. Based on the determined category, the TAM 104 mutes audio of the first tab 403 (represented by a mute icon) while playing the audio of the second tab 404 (represented by the speaker icon). Thus, the present disclosure enables automatic audio control/management in multiple tabs of one or more web browsers by determining which tab from amongst the multiple tabs should play/stream the audio based on tab content information and tab switching event, as described above. Thus, the present disclosure provides a complete solution to manage audio in browser multi-tab environment.

Figure 5A:
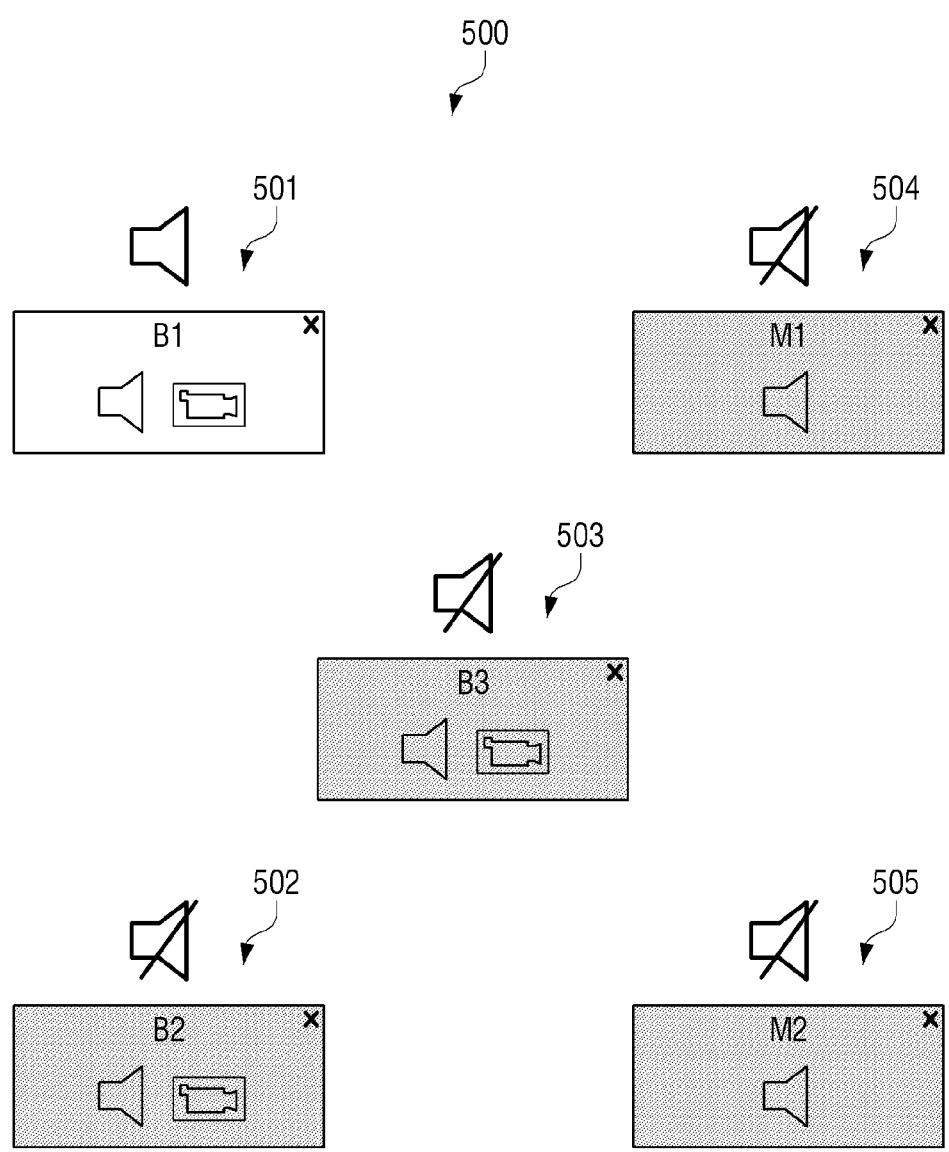
FIGS. 5A-5C illustrate a third example manifestation for audio management in multiple tabs of multiple applications, in accordance with an embodiment of the present disclosure.
Figure 5B:
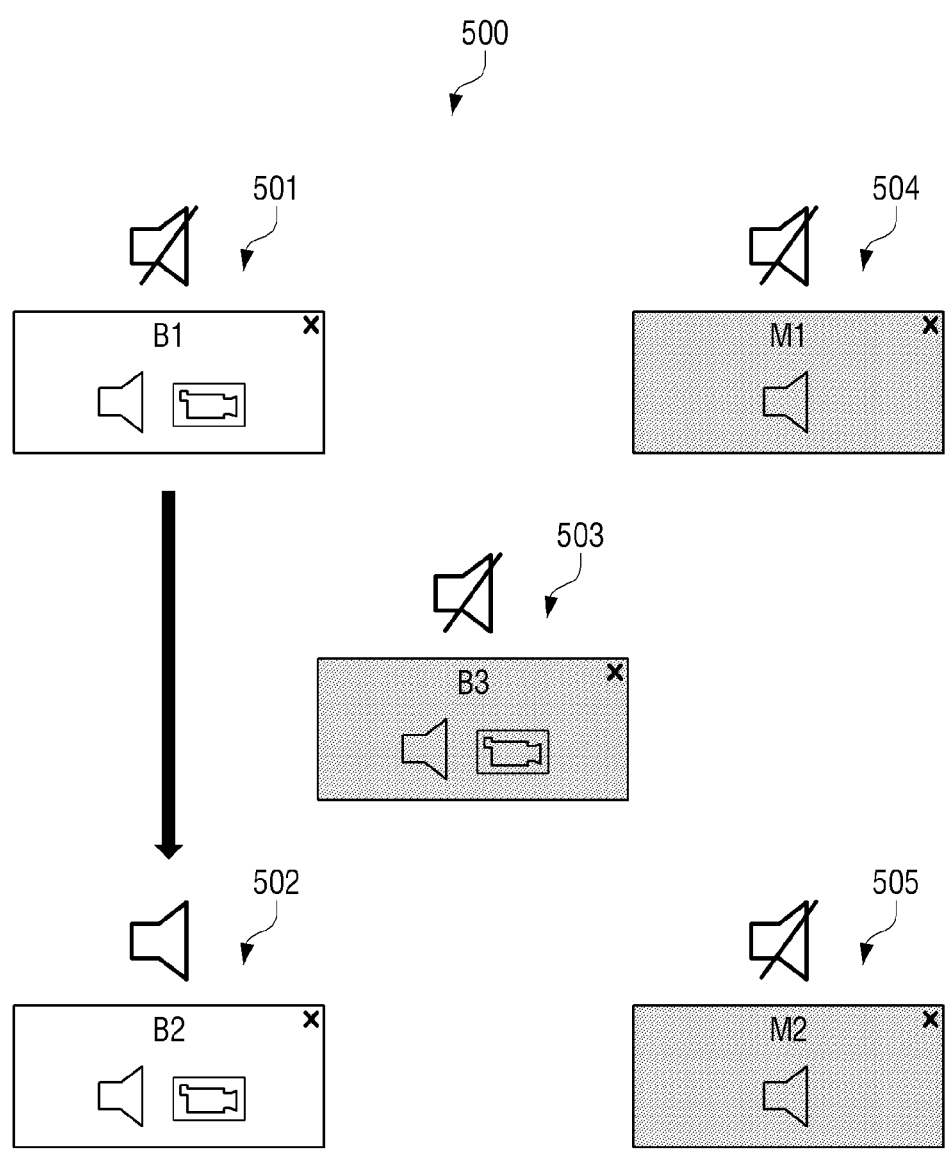
Figure 5C:
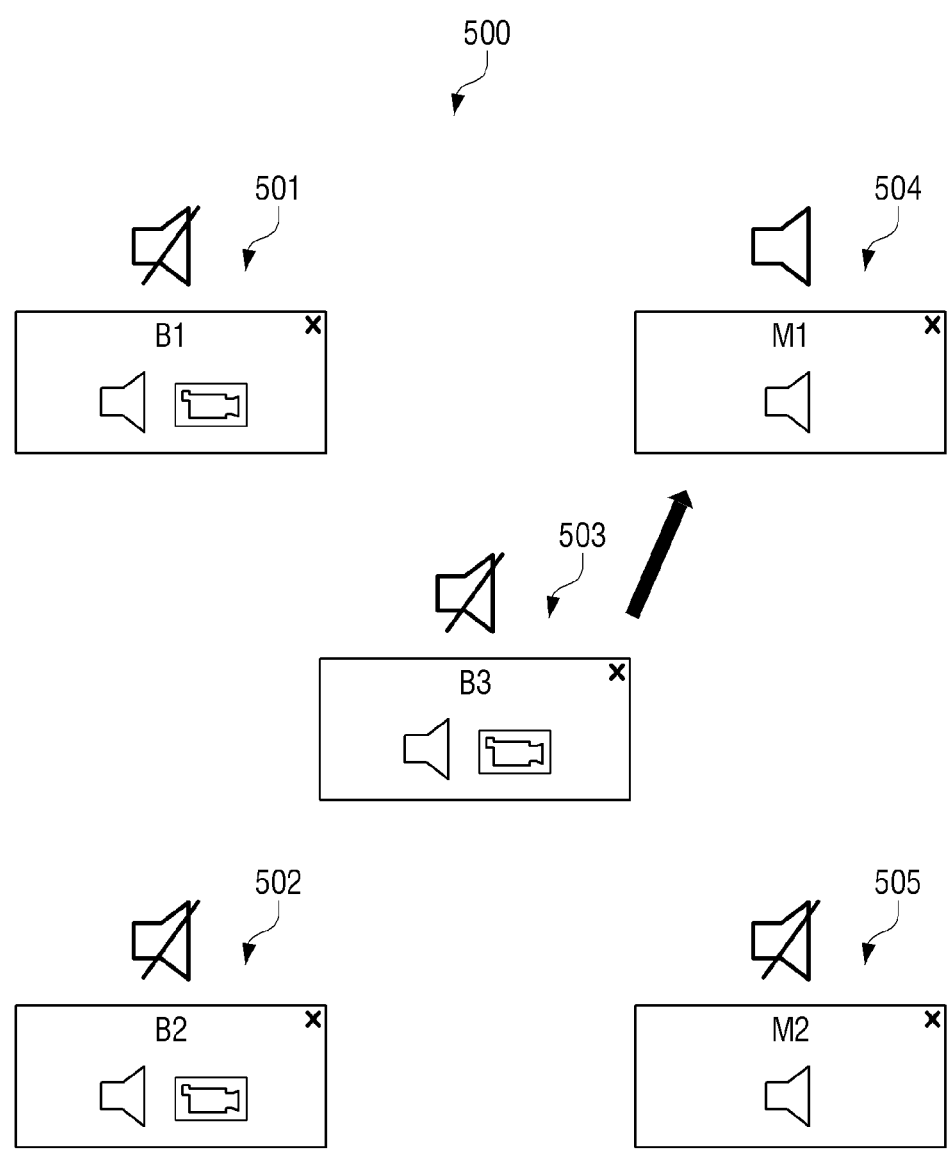

FIGS. 5A-5C illustrate a third example manifestation 500 for audio management in multiple tabs of multiple applications, in accordance with an embodiment of the present disclosure. In the example, a directional arrow represents a switching between a current application and other application.

The multiple applications include a first browser application (B1) 501, a second browser application (B2) 502, and a third browser application (B3) 503 streaming audio-video content. The multiple applications further include a first media playing application (M1) 504 and a second media playing application (M2) 505. Referring to FIG. 5A, the first browser application (B1) 501 is currently active and is streaming audio-video content (represented by speaker icons), while the remaining applications are not opened (represented by dotted patterns).

Referring to FIG. 5B, a user opens the second browser application (B2) 502. The TSDM 102 detects the switching is from the first browser application (B1) 501 to the second browser application (B2) 502 and that the switching is between a currently open application and a new application. The TCDM 103 determines the category of the second browser application (B2) 502 as audio producing application. Based on the determined category, the TAM 104 mutes audio of the first browser application (B1) 501 (represented by a mute icon) while playing the audio of the second browser application (B2) 502 (represented by the speaker icon). In a similar manner, the user may open the other applications and the audio is controlled.

Referring to FIG. 5C, the user may switch from the third browser application (B3) 503 to the first media playing application (M1) 504. The TSDM 102 detects the switching and the TCDM 103 determines the category of the applications as audio producing application. Accordingly, the TAM 104 mutes audio of the third browser application (B3) 503 and other applications (represented by a mute icon) while playing the audio of first media playing application (M1) 504 (represented by the speaker icon).

Thus, when multiple applications capable of streaming audio are running simultaneously, only one application is allowed to produce the audio that is currently active. This reduces audio interference from the multiple application and improves the user experience considerably.

FIG. 6 illustrates an example table 600 summarizing audio management while switching between tabs multiple tabs of one or more web browsers as described above.

Figure 7:
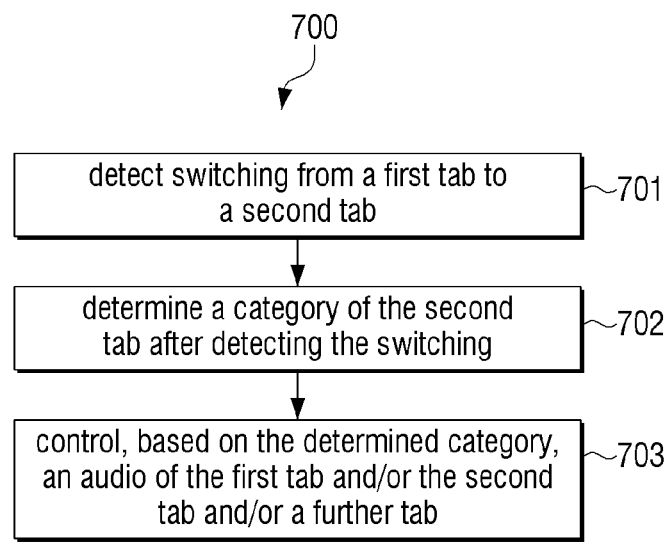
FIG. 7 illustrates an exemplary method for audio management in multiple tabs of one or more web browsers, in accordance with an embodiment of the present disclosure.

FIG. 7 illustrates an exemplary method for audio management in multiple tabs of one or more web browsers, in accordance with an embodiment of the present disclosure. The order in which the method is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the method can be implemented in any suitable hardware, software, firmware, or combination thereof.

At block 701, switching from a first tab to a second tab is detected. For example, the TSDM 102 detects switching from a first tab to a second tab on the device 100.

At block 702, a category of the second tab is determined after detecting the switching. For example, the TCDM 103 determines a category of the second tab after detecting the switching.

At block 703, an audio of the first tab and/or the second tab and/or a further tab is controlled based on the determined category. For example, the TAM 104 controls the audio of the first tab and/or the second tab and/or the further tab.

For example, if newly switched tab is an audio producing tab, then audio content of newly switched tab will be played and all other tab will be mute.

In another example, if newly switched tab is a non-audio producing tab, then audio of previous audio producing tab will continue to play audio content.

In another example, if newly switched tab is a non-audio producing tab, then audio of previous audio producing tab will continue to play audio content at lower volume, so as to provide the user with an ease to read the content of newly switched tab and continued listening previous audio tab.

In another example, if newly switched tab is a non-audio producing tab and previously there is no audio producing tab, then no audio content will be played.

Meanwhile, the various embodiments described above can be implemented in a recording medium that can be read by a computer or similar device using software, hardware, or a combination thereof. In accordance with the hardware implementation, the embodiments described in this disclosure may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and an electrical unit for performing other functions. According to software implementation, embodiments such as the procedures and functions described herein may be implemented with separate software modules. Each of the software modules may perform one or more of the functions and operations described herein.

Meanwhile, the method for audio management in multiple tabs of one or more web browsers according to various embodiments of the present disclosure described above may be stored in a non-transitory readable medium. The non-transitory readable medium may be installed in various apparatuses.

As an example, a non-transitory computer readable recording medium storing computer instructions that, when executed by a processor of an apparatus, cause the apparatus to perform operations comprises detecting switching from a first tab to a second tab, determining a category of the second tab after detecting the switching, and controlling, based on the determined category, an audio of the first tab and/or the second tab and/or a further tab may be provided.

The non-transitory computer readable medium refers to a medium that stores data semi-permanently rather than storing data for a very short time, such as a register, a cache, a memory or etc., and is readable by an apparatus. In detail, programs for executing the aforementioned various methods may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

While certain present preferred embodiments of the disclosure have been illustrated and described herein, it is to be understood that the disclosure is not limited thereto. Clearly, the disclosure may be otherwise variously embodied, and practiced within the scope of the following claims.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for audio management in multiple tabs of one or more web browsers, the method comprising:
    displaying a first tab on a first web browser and a second tab on a second web browser, wherein the first tab is active and the second tab is inactive;
    identifying a category for each of the first tab and the second tab, the category distinguishing between an audio producing tab and a non-audio producing tab based on whether the first tab and the second tab include content that is capable of producing audio;
    in response to detecting a switching event and based on that the first tab and the second tab are identified as the audio producing tabs, muting the first tab and unmuting the second tab;
    in response to detecting the switching event and based on that the first tab and the second tab are identified as the non-audio producing tabs and a further tab produces audio prior to the switching event, maintaining the audio of the further tab;
    in response to detecting the switching event and based on that the first tab is identified as the non-audio producing tab, the second tab is identified as the audio producing tab, and the further tab did not produce audio prior to the switching event, maintaining audio of the second tab;
    in response to detecting the switching event and based on that the first tab is identified as the non-audio producing tab, the second tab is identified as the audio producing tab, and the further tab produces audio prior to the switching event, muting the further tab and unmuting the second tab; and
    in response to detecting the switching event and based on that the first tab is identified as the audio producing tab and the second tab is identified as the non-audio producing tab, maintaining audio from the first tab or the further tab,
    wherein the second tab is categorized as the non-audio producing tab based on that (i) the content is not capable of producing audio or (ii) the content is capable of producing audio that is identified as non-user desired audio according to a previously set user setting.

2. The method of claim 1, wherein the switching event includes at least one of: opening a new tab, switching to an already opened tab, closing the already opened tab, or reopening a closed tab.

3. The method of claim 1, further comprising identifying the category of the second tab, when a webpage in the second tab is loaded, or when a user event is detected in the webpage.

4. The method of claim 1, wherein identifying the category comprises at least one of:
    parsing a document object model (DOM) in the second tab;
    monitoring whether a system media player or a media player plugin from the second tab is invoked;
    determining presence of an auto play HTML tag or an advertisement tag in the second tab;
    determining status of audio content or packets from a network;
    evaluating a URL of a webpage opened in the second tab, meta data of the webpage, or content of the webpage; and
    resolving a priority conflict with other applications producing sound at a same time.

5. The method of claim 1, wherein the identifying the category comprises determining whether a webpage that is opened in the second tab from a browser history or bookmarks of the one or more web browsers includes the audio.

6. The method of claim 1, further comprising changing an audio parameter when audio is muted or unmuted, in response to the switching event.

7. The method of claim 6, wherein the audio parameter includes at least one of: volume, pitch, audio language, tempo, and speed.

8. The method of claim 1, further comprising changing at least one audio parameter of the first tab or the further tab, when the first tab is identified as the audio producing tab and the second tab is identified as the non-audio producing tab.

9. The method of claim 1, further comprising changing at least one audio parameter of the further tab, when the first tab and the second tab are identified as the non-audio producing tab, and the further tab is identified as the audio producing tab.

10. The method of claim 1, wherein:
    the non-user desired audio includes an advertisement.

11. A device for audio management in multiple tabs of one or more web browsers, the device comprising:
    at least one processor configured to:
        display a first tab on a first web browser and a second tab on a second web browser, wherein the first tab is active and the second tab is inactive;
        identify a category for each of the first tab and the second tab, the category distinguishing between an audio producing tab and a non-audio producing tab based on whether the first tab and the second tab include content that is capable of producing audio;
        in response to detecting a switching event and based on that the first tab and the second tab are identified as the audio producing tabs, mute the first tab and unmute the second tab;
        in response to detecting the switching event and based on that the first tab and the second tab are identified as the non-audio producing tabs and a further tab produces audio prior to the switching event, maintain the audio of the further tab;
        in response to detecting the switching event and based on that the first tab is identified as the non-audio producing tab, the second tab is identified as the audio producing tab, and the further tab did not produce audio prior to the switching event, maintain audio of the second tab;
        in response to detecting the switching event and based on that the first tab is identified as the non-audio producing tab, the second tab is identified as the audio producing tab, and the further tab produces audio prior to the switching event, mute the further tab and unmute the second tab; and in response to detecting the switching event and based on that the first tab is identified as the audio producing tab and the second tab is identified as the non-audio producing tab, maintain audio from the first tab or the further tab, wherein the second tab is categorized as the non-audio producing tab based on that (i) the content is not capable of producing audio or (ii) the content is capable of producing audio that is identified as non-user desired audio according to a previously set user setting.

12. The device of claim 11, wherein the at least one processor is further configured to identify the category of the second tab, when a webpage in the second tab is loaded, or when a user event is detected in the webpage.

13. The device of claim 11, wherein to identify the category the at least one processor is configured to:
parse a document object model (DOM) in the second tab;
monitor whether a system media player or a media player plugin from the second tab is invoked;
determine a presence of an auto play HTML tag or an advertisement tag in the second tab;
determine status of audio content or packets from a network;
evaluate a URL of a webpage opened in the second tab, meta data of the webpage, or content of the webpage; and
resolve a priority conflict with other applications producing sound at a same time.

14. The device of claim 11, wherein the at least one processor is further configured to determine whether a webpage that is opened in the second tab from a browser history or bookmarks of the one or more web browsers includes audio.

15. The device of claim 11, wherein in response to the switching event the at least one processor is further configured change an audio parameter of the audio.

16. The device of claim 15, wherein the audio parameter includes at least one of: volume, pitch, audio language, tempo, and speed.

17. A non-transitory computer readable recording medium storing computer instructions that, when executed cause a processor of an apparatus to:
display a first tab on a first web browser and a second tab on a second web browser, wherein the first tab is active and the second tab is inactive;
identify a category for each of the first tab and the second tab, the category distinguishing between an audio producing tab and a non-audio producing tab based on whether the first tab and the second tab include content that is capable of producing audio;
in response to detecting a switching event and based on that the first tab and the second tab are identified as the audio producing tabs, mute the first tab and unmute the second tab;
in response to detecting the switching event and based on that the first tab and the second tab are identified as the non-audio producing tabs and a further tab produces audio prior to the switching event, maintain the audio of the further tab;
in response to detecting the switching event and based on that the first tab is identified as the non-audio producing tab, the second tab is identified as the audio producing tab, and the further tab did not produce audio prior to the switching event, maintain audio of the second tab;
in response to detecting the switching event and based on that the first tab is identified as the non-audio producing tab, the second tab is identified as the audio producing tab, and the further tab produces audio prior to the switching event, mute the further tab and unmute the second tab; and
in response to detecting the switching event and based on that the first tab is identified as the audio producing tab and the second tab is identified as the non-audio producing tab, maintain audio from the first tab or the further tab,
wherein the second tab is categorized as the non-audio producing tab based on that (i) the content is not capable of producing audio or (ii) the content is capable of producing audio that is identified as non-user desired audio according to a previously set user setting.

* * * * *

UNITED STATES PATENT AND TRADEMARK OFFICE
CERTIFICATE OF CORRECTION

PATENT NO. : 11,216,241 B2
APPLICATION NO. : 15/833505
DATED : January 4, 2022
INVENTOR(S) : Agarwal et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 102 days.

Signed and Sealed this
Eighteenth Day of February, 2025

Coke Morgan Stewart
*Acting Director of the United States Patent and Trademark Office*